United States Patent
Sugumar et al.

(10) Patent No.: US 6,829,680 B1
(45) Date of Patent: Dec. 7, 2004

(54) METHOD FOR EMPLOYING A PAGE PREFETCH CACHE FOR DATABASE APPLICATIONS

(75) Inventors: Rabin Sugumar, Sunnyvale, CA (US); Srikanth T Srinivasan, Durham, NC (US); Partha P. Tirumalai, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/477,867

(22) Filed: Jan. 5, 2000

(51) Int. Cl.[7] .............................................. G06F 12/00
(52) U.S. Cl. ................... 711/137; 711/122; 711/140; 711/133
(58) Field of Search ................ 711/137, 122, 711/146, 140, 169, 133–136, 159–160

(56) References Cited

U.S. PATENT DOCUMENTS

| | | | |
|---|---|---|---|
| 5,151,991 A | | 9/1992 | Iwasawa et al. |
| 5,293,609 A | * | 3/1994 | Shih et al. .................. 711/137 |
| 5,347,654 A | | 9/1994 | Sabot et al. |
| 5,361,357 A | | 11/1994 | Kionka |
| 5,551,046 A | * | 8/1996 | Mohan et al. ................. 707/8 |
| 6,182,111 B1 | * | 1/2001 | Inohara et al. .............. 709/201 |
| 6,182,133 B1 | * | 1/2001 | Horvitz ..................... 709/223 |

FOREIGN PATENT DOCUMENTS

| | | |
|---|---|---|
| EP | 0 437 712 A | 7/1991 |
| EP | 0 509 231 A | 10/1992 |

OTHER PUBLICATIONS

Klaiber A C et al., "An Architecture for Software–Controlled Data Prefetching," *Computer Architecture News*, May 1991, vol. 19., No. 3, New York, U.S., 6 pages.

R. Sugumar, "Page Prefetching for Database Workloads", *Second Workshop on Computer Architecture Evaluation using Commercial Workloads*, CAECW '99, Orando, Florida, Jan. 10, 1999.

* cited by examiner

*Primary Examiner*—Matthew D. Anderson
(74) *Attorney, Agent, or Firm*—Martine & Penilla, LLP

(57) ABSTRACT

A method for increasing the processing speed of database instructions using a page prefetch cache. More particularly, the method is executed on a microprocessor and reduces database cache misses and improves the processing speed. The method comprises enabling a page prefetch cache with a database application, issuing one or more page prefetch instructions, and determining whether the particular database page is in the page prefetch cache.

18 Claims, 4 Drawing Sheets

METHOD FOR EMPLOYING A PAGE PREFETCH CACHE FOR DATABASE APPLICATIONS

BACKGROUND OF THE INVENTION

1. Field of the Invention

The present invention relates to database processing. More particularly, the present invention relates to a method for improving the processing speed of database instructions using a page prefetch cache.

2. The Background Art

One of the primary functions a computer is required to perform is that of processing information present in databases. When the database is large, it is necessary to have the processing function perform as efficiently as possible, or valuable time and computer resources may be wasted.

Database applications spend a significant fraction of time waiting on data stream cache misses. It is well known that cache misses contribute to a significant fraction of cycles per instruction (CPI) on database workloads. Many of these cache misses are due to accessing database data structures called "pages".

Database engines store data records in physical memory and on a hard disk in the form of pages. Each page holds several data or index records. The page size is typically in the range 2 kilobytes (KB) to 8 KB. The total amount of data that databases maintain in pages is large, e.g. gigabytes. Accessing pages within the database has a propensity to cause compulsory or capacity cache misses.

The end result of these cache misses is that they cause delays in processing an instruction. If data required to process the instruction is not available in data cache memory, valuable central processing unit (CPU) cycles are wasted while the required data is retrieved from external memory, a process which can often take up to 100 or more CPU cycles. During these CPU cycles, the CPU is either executing instructions which cause the data to be retrieved, or is waiting for the required data to be present in the data cache.

It would therefore be beneficial to provide an apparatus and method for ensuring that data required for the execution of an instruction is present in a data cache memory or other memory storage close to the pipeline prior to that data being required for the execution of an instruction.

SUMMARY OF THE INVENTION

The present invention comprises an apparatus for reducing the impact of cache misses using a page prefetch cache. The page prefetch cache resides on a CPU chip or in an adjacent off-chip architecture. The page prefetch cache has space to store "n" complete database pages in which the database page size varies but is typically in the range of 2 KB to 8 KB where typically "n" is a small number. By way of example and not of limitation, the number of database pages stored by the page prefetch cache is four.

In operation, during a database application, the page prefetch cache is enabled. The CPU issues a page prefetch instruction to load pages into the page prefetch cache. For optimal benefit the database page needs to be loaded into the page prefetch cache prior to the first use of the database page. All load instructions check the page prefetch cache. If the requested database page is in the page prefetch cache, access to that data page do not slow the CPU or are returned to the pipeline much faster.

Numerous means for generating page prefetch instructions can be employed. By way of example, the means for generating a page prefetch instruction include a compiler or developer software. The compiler or developer software identifies locations in the code where access to a particular database page will start. Locations are identified through a profile feedback or through a plurality of "pragmas" inserted in the source code by the developers. The compiler inserts the new page prefetch instruction at the designated locations defined by the profile feedback or pragmas. The newly inserted page prefetch instructions bring the page to be accessed into the page prefetch cache. When the page prefetch instruction is executed, the entire page is received by the page prefetch cache. Subsequent load instructions that access the page prefetch cache return the prefetched database pages to a pipeline significantly faster.

The present invention provides a method for reducing cache misses and improving performance. The method provides for the issuance of pre-fetch commands which store one or more database pages in the page prefetch cache before each of the database pages must be accessed. Simultaneously, as database page prefetch commands are issued, the method determines whether the page prefetch cache has a free entry for a new database page.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons having the benefit of this disclosure.

Figure 1:
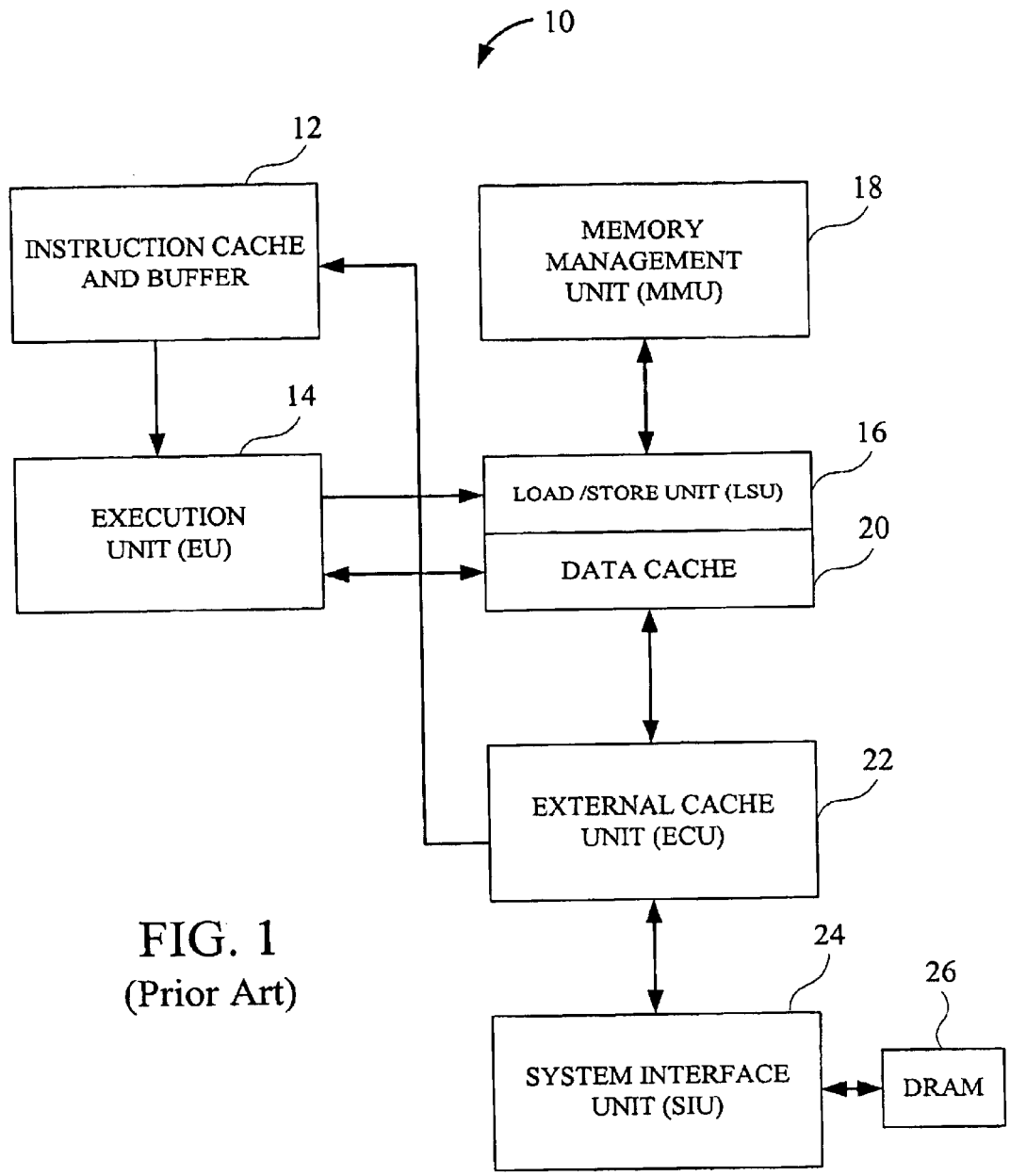
FIG. 1 is a block diagram of a representative prior art Central Processing Unit (CPU) for processing database instructions.

FIG. 1 is a block diagram of a representative prior art Central Processing Unit for processing database instructions.

Referring to FIG. 1, a prior art Central Processing Unit (CPU) 10 includes an instruction cache 12 from which instructions are fetched. Instructions other than the loads and stores are executed by the executing unit 14. Load store instructions are executed by the load store unit 16. The processing of load instructions are described more carefully below.

The load store unit 16 calculates the address for load store instructions. The address is translated by the memory management unit 18. The translated address is used by the load store unit 16 to look up the level-1 data cache 20 and determine if the address has been loaded into the data cache 20. If the address is found in the level data cache 20, data is read from the data cache 20 and returned to the pipeline. If the address is not found, a request is sent to the level-2 external cache unit 22.

The level-2 external cache unit 22 looks to the level-2 external cache to see if the address has been loaded into the level-2 external cache previously. If the address is found, data is returned from the level-2 external cache unit 22. If the address is not found, the level-2 cache unit 22 sends a request to the system interface unit 24. The system interface unit 24 then proceeds to get the data from DRAM memory 26.

Persons with ordinary skill in the art will appreciate that the prior art description is a typical hardware configuration and that there are similar configurations which can be used to perform similar functions with data flow. By way of example and not of limitation, certain prior art CPUs may not have a level-2 external cache unit, and when a miss in the data cache occurs, the request may be submitted directly to DRAM memory. Other hardware configurations may have more than the two levels of cache.

Accessing each respective cache level or the system memory takes time. When data is found in the data cache unit 20, it is returned to the pipeline in a few CPU cycles. When data is not found in the data cache unit 20, but instead in the level-2 external cache unit, it is typically returned to the pipeline in 10 to 20 cycles. If the data is not found in the level-2 external cache unit, but is found in the DRAM memory it is typically returned to the pipeline in about 100 CPU cycles. When waiting for data from level-2 external cache unit or DRAM memory, the pipeline is typically idle. Such waiting results in wasted CPU cycles and contributes to performance degradation.

The present invention is directed to providing an apparatus and method for executing load store instructions quickly by teaching a cache structure adjacent the pipeline which may be accessed quickly. Additionally, the present invention is directed to an apparatus and method for minimizing data cache misses, thereby increasing the likelihood that data required to process a command which will be present when the command needs to be executed. Thus, a new "prefetch page XX" command is provided, together with associated hardware required to store the prefetched data. In the command syntax above, the "XX" symbol is intended to designate a particular database page.

Figure 2:
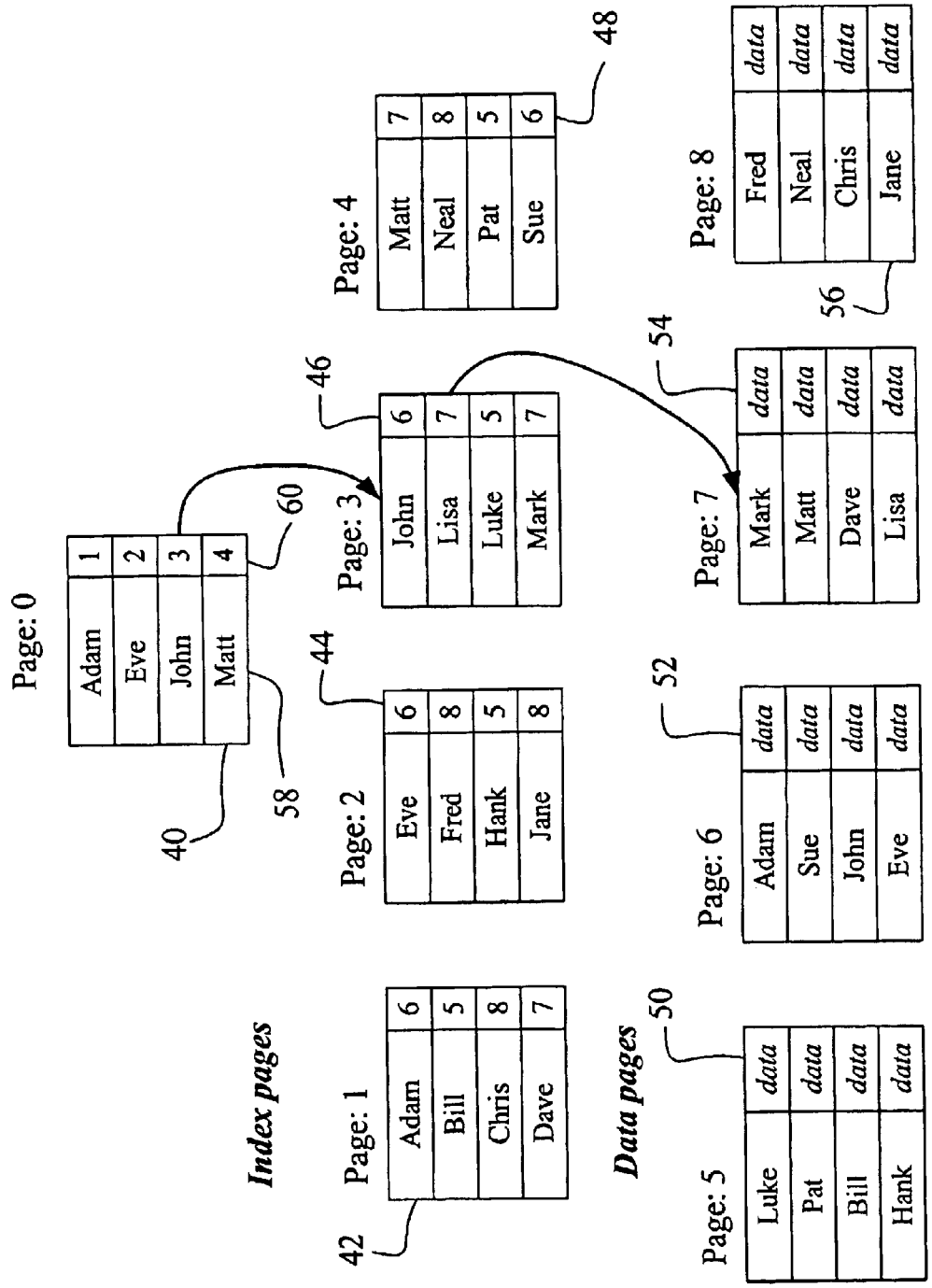
FIG. 2 provides an example of the type of data which may be prefetched using the present invention.

FIG. 2 provides an example of the type of data which may be prefetched using the present invention.

Databases are large collections of data organized as tables and indexes which are stored in units called pages. By way of example and not of limitations, pages are typically 2 kb to 8 kb in size, and are used for read and write operations. A typical database will have thousands of pages, all containing index information or actual record data. Two major types of database pages exist, index pages and data pages.

An index page is a page containing information relating to a range of data, and having a pointer to sub-tier pages having narrower ranges of data. Examples of index pages are included in FIG. 2 as pages 40, 42, 44, 46 and 48. Index page 40, for example, includes four entries, each entry having an index 58 and a pointer 60. The index 58 provides the first element of a range, and a pointer 60 associated with that range points to another page which represents that range in more detail.

Index page 40 has indexes "Adam", "Eve", "John" and "Matt". Thus, the index "John" represents the range of all names including and following "John", ending with, and not including the name "Matt". Should a search require a record having an index within the range defined for "John", the next page to be required is page 3 having reference numeral 46, the page pointed to by pointer 60. Page 3 having reference numeral 46 then points to the data page containing the actual record sought for in the search being performed.

A data page is a page containing actual information relating to a range of data, and having a pointer to sub-tier pages having narrower ranges of data. Examples of data pages are included in FIG. 2 as pages 50, 52, 54, and 56.

Using the database page prefetch instruction described herein, and using the apparatus disclosed herein, the number of cycles per instruction required for a given number of instructions will drop significantly, showing an improvement in efficiency, thus allowing for more instructions to be executed, for a given period of time.

Figure 3:
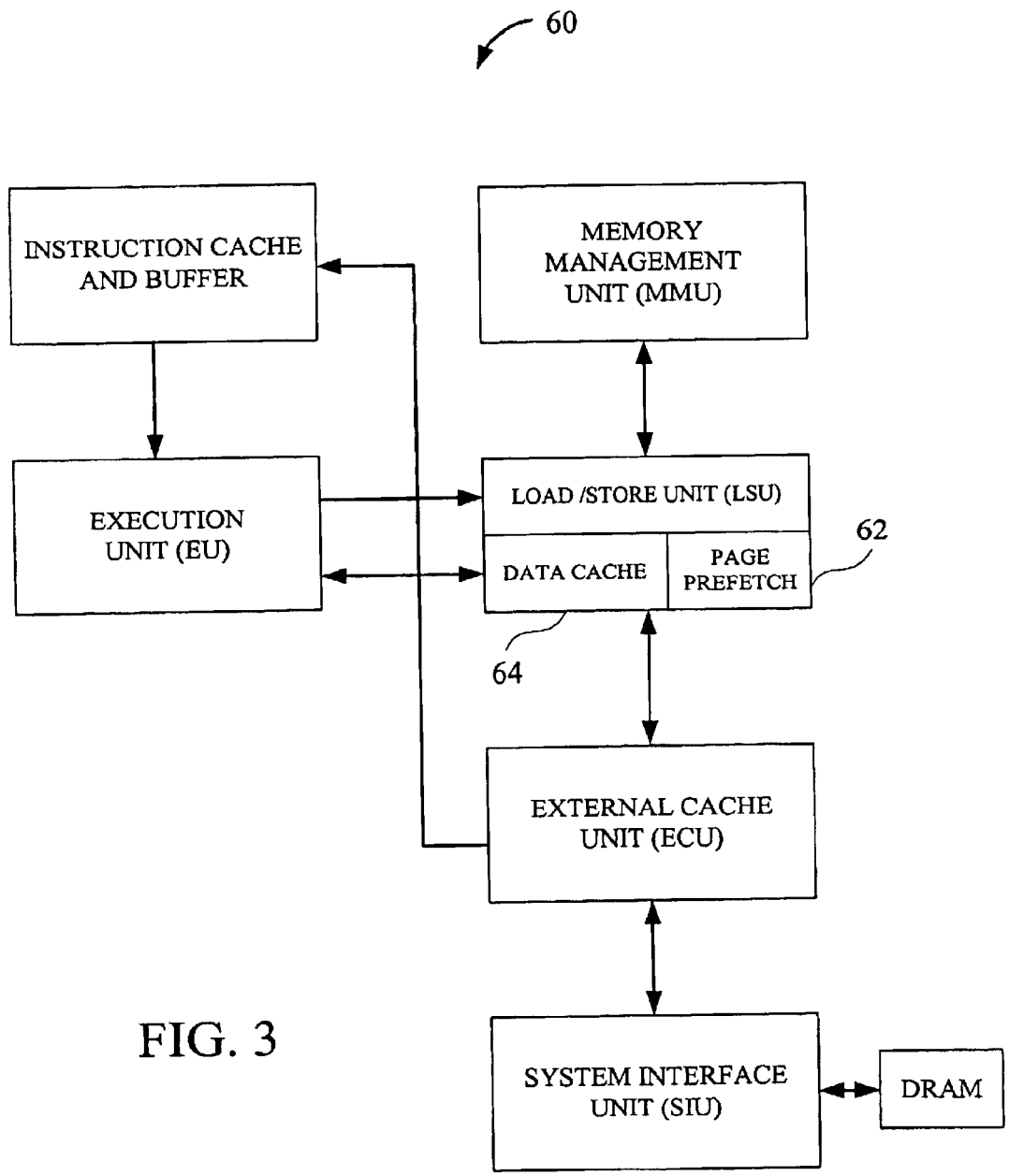
FIG. 3 is a block diagram of the present invention having a CPU with a database prefetch cache.

FIG. 3 is a block diagram of the present invention having a CPU with a database prefetch cache.

Referring to FIG. 3, The present invention provides a modification to the CPU described in the prior art. The modified CPU 60 reduces the number of cache misses for database pages by using a page prefetch cache 62. In its preferred embodiment, the page prefetch cache is a fully associative buffer. The page prefetch cache 62 resides on a CPU chip adjacent a data cache 64, as shown in FIG. 3. Alternatively, the page prefetch cache may located on an adjacent off-chip structure (not shown). The page prefetch cache 62 has space to store "n" complete database pages where typically "n" is a small number. It shall be appreciated by those skilled in the art that presently the page size varies between the range of 2 KB to 8 KB. However, the invention should not be viewed as being limited to having page sizes of 2 K to 8 K. By way of example and not of limitation, the number of database pages stored by the page prefetch cache is four.

Additionally, the present invention provides for the CPU to issue a page prefetch instruction which loads pages into the page prefetch cache 62. For optimal benefit the database page needs to be loaded into the page prefetch cache prior to the first use of the database pages. All load instructions check the page prefetch cache 62 and first level data cache 64. If the requested database page is in the page prefetch cache, the data for the load is returned to the pipeline much faster.

In the operation, the page prefetch cache is enabled during a database application. The page prefetch cache has a corresponding validity bit (not shown) that enables the page prefetch cache. When a database application is not employed, the validity bit disables the page prefetch cache.

Numerous means for generating page prefetch instructions can be employed. Page prefetch instructions provide database pages to the page prefetch cache 62. By way of example, the means for generating a page prefetch instruction include a compiler or developer software. The compiler or developer software identifies locations in the code where access to a particular database page will start. Locations are identified through a profile feedback or through a plurality of "pragmas" inserted in the source code. Pragmas are a standardized form of comment which have a particular meaning to a compiler. The compiler inserts the new page prefetch instruction at the designated locations defined by the profile feedback or pragmas. When the page prefetch instruction is executed the requested page is received by the page prefetch cache 62. Subsequent load instructions access the page prefetch cache and return data to the pipeline significantly faster.

Figure 4:
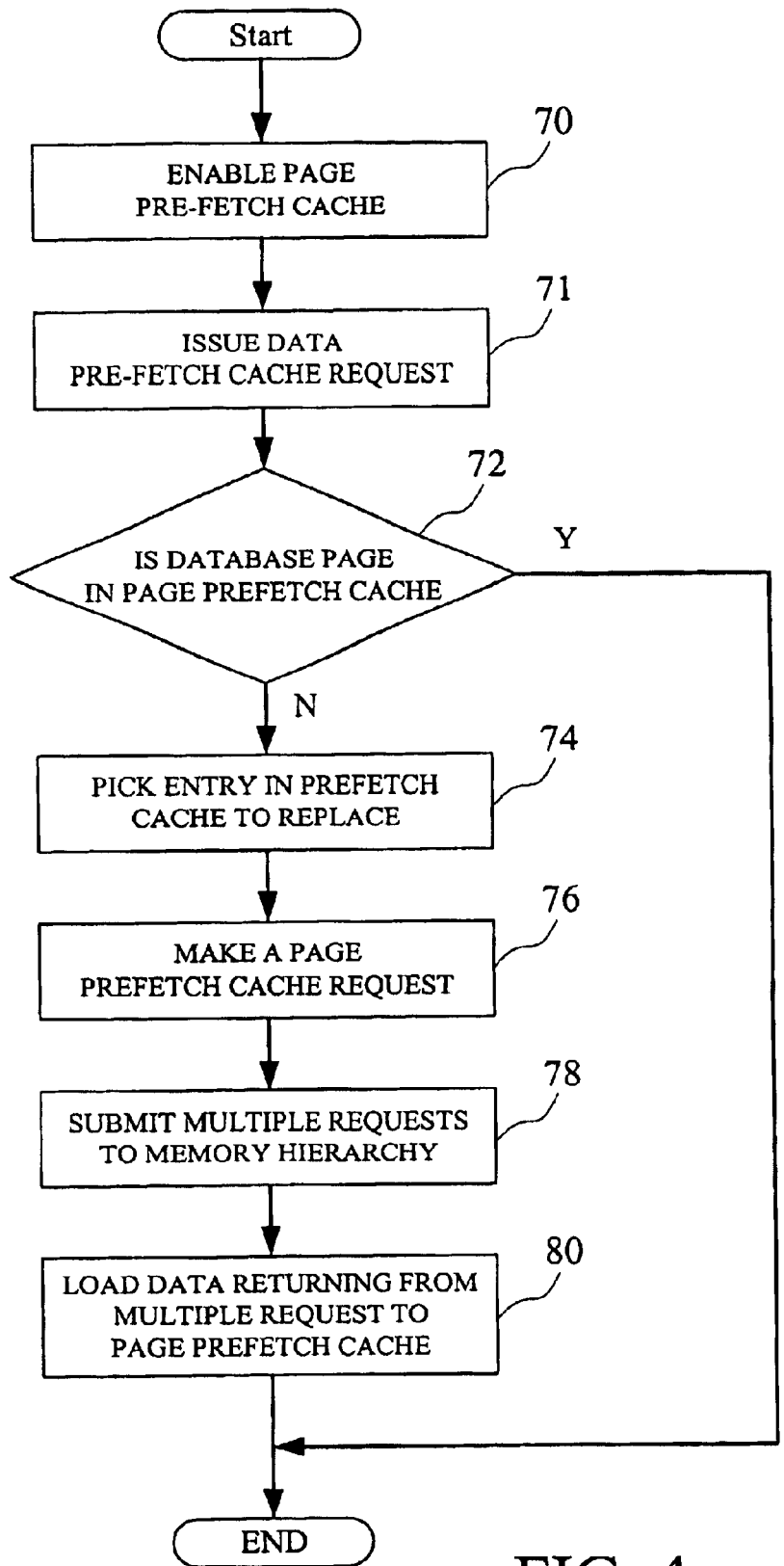
FIGS. 4 is a flowchart showing acts performed by the method of the present invention.

FIGS. 4 is a flowchart showing acts performed by the method of the present invention.

Referring to FIG. 4, the method begins at block 70 where the page prefetch cache is enabled. In one embodiment, the page prefetch cache is enabled when a database application is engaged. Alternatively, the page prefetch cache may be enabled by another application that employs database pages. The method then proceeds to block 71.

At block 71 an instruction such as "prefetch page XX" is issued, the XX symbology representing a database page which is known to be required for an upcoming operation. As would be known to those of ordinary skill in the art the exact syntax used herein is not required to be used. It is the concept of prefetching database pages and having those pages in memory prior to the time instructions requiring their availability that is sought to be protected.

In one embodiment, the compiler or developer software (not shown) identifies locations in the code where a series of submissions for a particular database page will start either through profile feedback or through pragmas inserted in the source code. Pragmas are a standardized form of comment which has a particular meaning to a compiler. The compiler inserts the new page prefetch instruction at specified locations which bring the database page about to be accessed into the page prefetch cache.

At block 72, it is determined whether the required database page is in page prefetch cache 62. By way of example and not of limitation, the size of the database pages in the page prefetch cache is between 2 K to 8 K. If at block 72, it is determined that the data is in the page prefetch cache, then the method is completed. Recall that load instruction which access the page prefetch cache return data to the pipeline much faster.

However, if at block 72 is determined that the data is not in the page prefetch cache, then the method proceeds to block 74. At block 74, the method picks the entry in the prefetch cache to discard or replace. By way of example and not of limitation, stale entries may be discarded by a page prefetch cache manager (not shown) so that sufficient space is available in the page prefetch cache to store the required data. Other methods well known to the those skilled in the art may be used to determine which entries in the page prefetch cache to discard. By way of example and not of limitation, one such method includes determining the "least-recently used" page entries in page prefetch cache 62, and discarding enough of those entries to create sufficient free space. The method then proceeds to block 76.

At block 76, a page prefetch cache request is made. It shall be appreciated by those with ordinary skill in the art the page request is divided into a plurality of smaller requests, which in combination make up the data base page request. By way of example and not of limitation, a 2 K database page request is divided into a plurality of 64 byte requests. The method then proceeds to block 78.

At block 78, multiple requests are submitted to the memory hierarchy. As described previously each respective cache level, from the fastest to the slowest is accessed, and then the system memory is accessed. By way of example, the data cache is first accessed, then the L-2 external cache is accessed, and finally the DRAM is accessed. The method then proceeds to block 80.

At block 80, data is loaded from the multiple requests to the page prefetch cache. The plurality of data requests are combined to generate a database page which is then stored in the page prefetch cache. By way of example, the combination of the multiple 64 byte requests are combined to generate the 2 K database page which is stored in the page prefetch cache. The page prefetch cache is then ready to return data to the pipeline. The method is then completed.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method executed on a microprocessor for reducing database cache misses and improving the processing speed, comprising:
   providing a level-1 data cache;
   providing a page prefetch cache adjacent said level-1 data cache, said page prefetch cache configured to receive and store one or more database pages;
   checking whether a database application is employed;
   if said database application is employed, enabling said page prefetch cache; and
   issuing one or more page prefetch instructions for a particular database page, before access to said particular database page is required.

2. The method of claim 1 further comprising determining whether said particular database page is in said page prefetch cache.

3. The method of claim 2 further comprising identifying locations within a software code to insert page prefetch instructions.

4. The method of claim 2 wherein it is determined that said database page is not in said page prefetch cache, further comprising, picking an entry in said page prefetch cache to discard.

5. The method of claim 4 further comprising making a page prefetch cache request.

6. The method of claim 5 wherein the making of the page prefetch cache request further comprising, dividing said request into a plurality of smaller requests.

7. The method of claim 6 further comprising submitting said plurality of smaller requests to a memory hierarchy.

8. The method of claim 7 further comprising loading data received from said smaller multiple requests to said page prefetch cache.

9. The method of claim 1 further comprising returning said database page to a pipeline.

10. The method of claim 8 further comprising returning said database page to a pipeline.

11. The method of claim 1, wherein said method operation of checking whether said database application is employed includes, checking a validity bit corresponding to said page prefetch cache to determine whether said database application is employed.

12. A method executed on a microprocessor, comprising:

checking whether a database application is employed;

if said database application is employed, enabling a page prefetch cache with a database application;

issuing one or more page prefetch instructions for a particular database page, before access to said particular database page is required; and determining whether said particular database page is in said page prefetch cache.

13. The method of claim 12 wherein it is determined that said database page is not in said page prefetch cache, further comprising, picking an entry in said page prefetch cache to discard.

14. The method of claim 13 further comprising making a page prefetch cache request.

15. The method of claim 14 wherein the making of the page prefetch cache request further comprising, dividing said request into a plurality of smaller requests.

16. The method of claim 15 further comprising submitting said plurality of smaller requests to a memory hierarchy.

17. The method of claim 16 further comprising loading data received from said smaller multiple requests to said page prefetch cache.

18. The method of claim 12, wherein said method operation of checking whether said database application is employed includes, checking a validity bit corresponding to said page prefetch cache to determine whether said database application is employed.

* * * * *